United States Patent [19]

De Baynast

[11] 3,772,152

[45] Nov. 13, 1973

[54] PROCESS FOR MANUFACTURING ENZYMES FROM HYDROCARBONS

[75] Inventor: Régis De Baynast, Versailles, France

[73] Assignee: Institut Francais du Petrole, des Carburants et Lubrifiants et Entreprise de Recherches et d'Activites Petrolieres, ELF

[22] Filed: Aug. 30, 1971

[21] Appl. No.: 176,186

[30] Foreign Application Priority Data

Sept. 7, 1970   France ............................. 7032505

[52] U.S. Cl. ............................ 195/66 R, 195/28 R
[51] Int. Cl. ......................... C07g 7/02, C12d 13/10
[58] Field of Search ................. 195/65, 66 R, 28 R, 195/96

[56] References Cited
UNITED STATES PATENTS 3,616,234  10/1971  Komagata et al. ................ 195/66 R
3,674,643  7/1972   Aunstrup et al. ................. 195/66 R
3,268,412  8/1966   Champagnat et al. ................ 195/3

Primary Examiner—Lionel M. Shapiro
Attorney—I. William Millen et al.

[57] ABSTRACT

Process for manufacturing enzymes comprising cultivating hydrolase excreting microorganisms in a nutrient culture medium, sporulating the resulting microorganisms, separating the enzymes from the liquid phase, the essential nitrogen and carbon source of the culture medium consisting of a yeast-cell containing fermentation product of yeasts on a substrate consisting essentially of hydrocarbons including a substantial part of linear paraffinic hydrocarbons.

16 Claims, 1 Drawing Figure

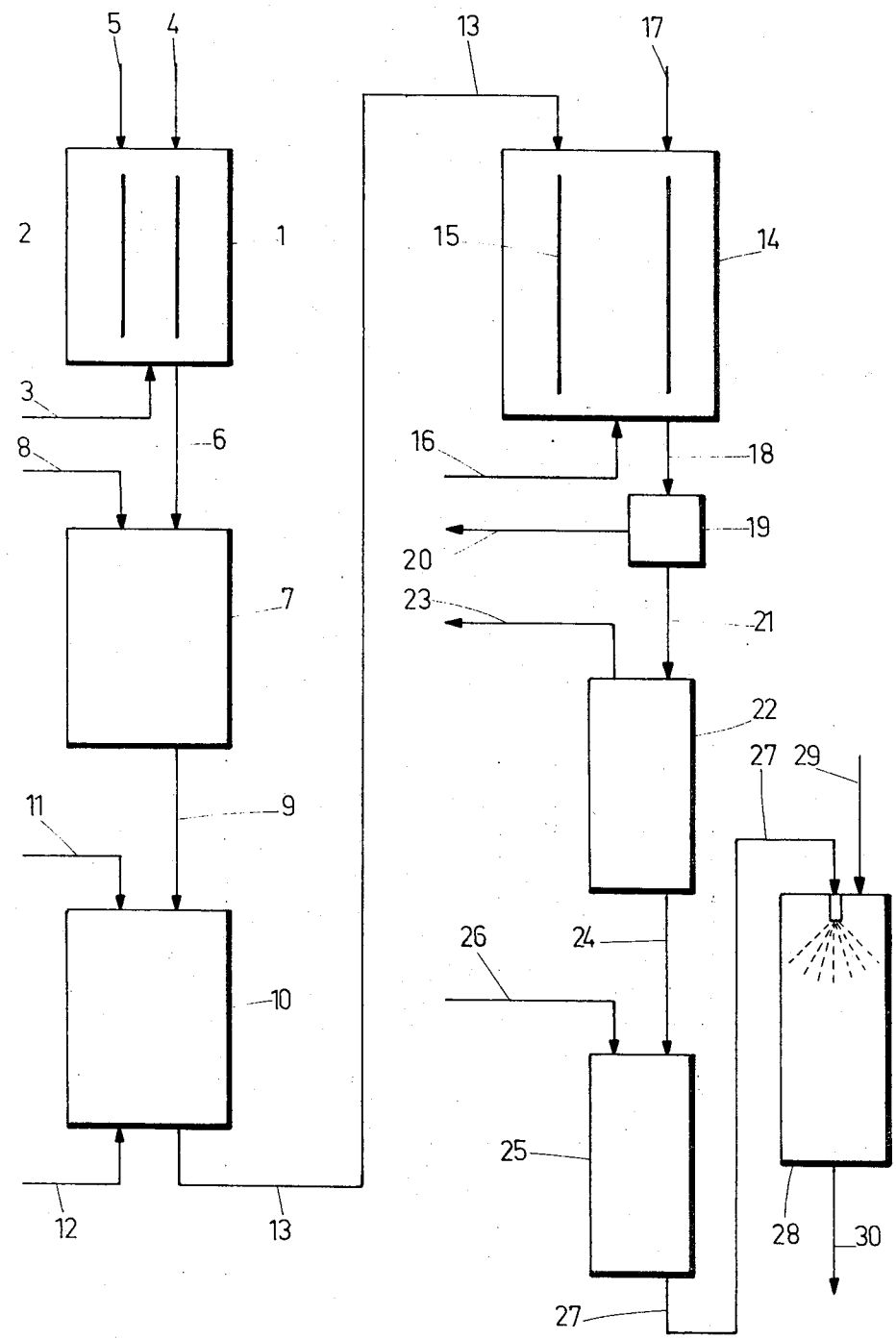

PROCESS FOR MANUFACTURING ENZYMES FROM HYDROCARBONS

This invention relates to a new microbiological process for manufacturing enzymes from hydrocarbons, particularly enzymes of the protease type, useful as constituents for washing powders, amylases and more generally hydrolases.

It is already known to prepare hydrolases from a conventional substrate such, for example, as soya oil cake, fish or meat meal which have in common a high protein content. The media prepared from these substrates are usually seeded with hydrolase excreting strains among which Bacillus subtilis is the most frequently used.

However numerous drawbacks result from the use of these substrates:
their high price,
their irregular quality,
the preparation of the media is not easy to carry out since solids are to be handled,
the spore separation is sometimes difficult.

Accordingly it appeared interesting to cultivate excreting strains on simplified media but, up to now, the attempts therefor have not been successful.

The process of this invention consists of growing hydrolase, particularly protease excreting microorganisms, on a substrate of yeasts obtained by culture thereof on a hydrocarbon substrate, the growing phase being followed with a phase of sporulation and separation of the enzymes from the obtained liquid phase.

According to a preferred embodiment, the same aqeuous inorganic medium is used in a first stage for the culture of yeasts and subsequently, after having modified the pH thereof, for the growing and sporulation of microorganisms.

The culture of yeasts involves, in addition to the seeded yeasts,
a. a hydrocarbon charge containing at least 10 percent, advantageously at least 85 percent (preferably at least 92 percent) of linear paraffinic hydrocarbons,
b. an aqueous nutrient medium, and
c. a gas-containing molecular oxygen.

The temperature may be from 20° to 40° C, preferably from 27° to 33° C. The pH may be in the range of from 2.5 to 6.5 and preferably from 3 to 6. This pH may be maintained by addition of alkaline compounds, preferably ammonia.

As examples of yeasts are to be mentioned the Endomycetacea, particularly the Saccharomycetoideae, for example, the Pichia, Hansenula and Debaryomyces genera, and the Lipomycetoideae, e.g., the Lipomices genus. Cryptococcaceae, e.g., Torulopsis and Candida, and Rhodotoruloideae, e.g., Rhodotorula are also to be mentioned.

The hydrocarbons contain, for example, from six to 35 carbon atoms in their molecule, preferably from 12 to 24.

The aqueous nutrient media for yeasts are well known. Their composition depends, to a certain extent, on the type of yeast used. As particularly necessary elements are to be mentioned nitrogen, e.g. as $NH_4^+$ ions, nitrates of urea, phosphorus, e.g., as soluble phosphates of alkaline or alkali-earth metals or ammonium. Other elements, generally necessary, are potassium, sodium, magnesium and calcium, as well as certain anions, e.g., $Cl^-$ and $SO_4^{--}$.

However, for sake of security, it is preferred to make use of small amounts of other metal salts and other acids, these salts acting in some cases as oligoelements. Iron, manganese and zinc are to be mentioned. Growing factors such as, for example, B vitamins, can also be added.

The salt concentration of the starting aqueous medium will be usually from 0.5 to 10 grams per liter, these values being, however, not limitative.

The yeasts concentration, at the end of the growing stage, is usually from 1 to 50 g (preferably from 5 to 30 g) per liter of the culture medium. The initial concentration may be as low as desired.

The starting concentration of linear paraffinic hydrocarbons is usually from 1 to 50 g per liter of culture medium and preferably from 5 to 30 g per liter. Higher concentrations may however be used.

The culture of yeasts is generally continued until the content of unbranched paraffinic hydrocarbons becomes lower than 1 g per liter, e.g., from 0.1 to 0.6 g per liter. However when the culture is continuous, these values may be kept substantially constant during the whole culture stage and close to 0.5 g per liter (e.g., from 0.1 to 2 g per liter). Of course, it is also possible to operate with lower conversion rates of n-paraffins.

At the end of this culture stage the pH is brought to a value which is higher by at least one unit, e.g., from 6 to 9 (preferably from 6.5 to 8.5) and the temperature is selected within the range of from 30° to 40° C, preferably from 34° to 39° C.

The seeding is conducted with a bacterium or mould excreting hydrolases, particularly proteases, e.g., of the Bacillus or Aspergillus type. It has been discovered, and this is a surprising and advantageous result, that these microorganisms grow remarkably well (particularly high yields of enzyme with respect to the starting substrate and products of satisfactory purity).

It has been observed, for example, that no inhibition of the Bacillus subtilis growth occurred, either as a result of the presence of residual hydrocarbons of the yeast culture, or of the presence of metabolism products in the culture medium (fatty acids) and that, on the contrary, Bacillus subtilis may use for its growth the carbon-containing materials of the culture medium.

When conventional cultures are made, mixture of dry substrates have to be used, inorganic salts and water must be added and the medium must be sterilized before seeding the fermentation vessel. All of these elements are simultaneously present in the medium, together with the growth factors (vitamins) which amounts to a surprisingly high economic advantage.

According to a preferred embodiment, the product of the yeast culture is subjected to a lysis treatment, e.g., autolysis, hydrolysis or plasmolysis. The culture may, for example, be brought to a temperature higher than 40° C, e.g., from 40° to 65° C. It may also be treated at this temperature with proteolytic enzymes, e.g., a portion of those obtained by the present process. There can also be added substances containing –SH groups, e.g., mercaptoethanol, which make the walls of the yeasts more permeable by reducing the number of disulfide bridges (S–S bonds). The pH is advantageously between 7 and 9. This treatment may be continued from 1/2 hour to 24 hours, for example. The later stage of cultivating microorganisms is thus made much easier since the substrate availability is thereby increased.

It is thus possible to make direct use of the previous culture medium for cultivating the bacterium or the mold, without other changes than that of the pH value and, also preferably, the temperature. However, in some cases, a further amount of oligoelements, useful for the sporulation, such as $Ca^{++}$, $Fe^{++}$, $M^{++}$, $SO^{--}$ $Cu^{++}$ and $Zn^{++}$ may be added in the form of salts, acids, oxides or hydroxides.

A soluble glucide, e.g., glucose, may also be added.

The sporulating bacteria are well known in the art and need not to be listed here. There can be used, for example, bacteria of the sporulale class having as biological characteristics, the power of hydrolyzing proteins.

Among the Bacillales, are to be mentioned the Bacillus genus with the following species :

*Bacillus subtilis*
*Bacillus megaterium*
*Bacillus cereus*
*Bacillus licheniformis*
*Bacillus pumilus*
*Bacillus coagulans*
*Bacillus firmus*
*Bacillus larvae*

In the Bacteridium genus, the following species :

*Bacteridium panis*
*Bacteridium septogenes*

Among the fungi imperfecti is to be mentioned the Aspergillus genus and the following species :

*Aspergillus glaucus*
*Aspergillus oryzae*
*Aspergillus flavus*
*Aspergillus niger*

During this culture phase, the concentration of bacteria or other microorganisms increases, e.g., up to from $10^5$ to $10^9$ bacteria per milliliter when operating batchwise. It may be maintained in this range when operating in a continuous manner with a stay time of from about 1 to 5 hours.

The product of this culture is thereafter subjected to conditions favoring sporulation, particularly a relatively long residence time of more than 5 hours, e.g., from 10 to 30 hours. The culture medium, at this stage, becomes impoverished in substrate; there can be added, however, if necessary, the above-mentioned oligoelements required for the sporulation. There is also maintained an active ventilation in view of the high oxygen requirements.

At the outlet from the fermentation vessel, the effluent is filtered or centrifugated so as to separate the bacterial spores and the yeast residues from the liquid phase. This separation is made easier due to the fact that, in most cases, the spores are fixed onto the yeast residues and consequently are easily separated from the liquid.

In order to preserve the product from any contamination, an antibiotic may be added thereto.

The liquid phase may be treated subsequently in a known manner and, in particular, evaporated under reduced pressure, at a temperature preferably not in excess of 40° C, so as to avoid the enzyme degradation. A solid phase is separated, e.g., by precipitation from acetone or isopropyl alcohol, or from any other conventional anti-solvent, e.g., ammonium sulfate. It is also possible to make use of ion exchange resins. The precipitate may be dried, preferably in cold condition, e.g., by lyophilization, but there can also be used the spray drying in a hot air stream.

The process may be performed in a continuous manner or batchwise. The accompanying drawing illustrates a preferred embodiment of the invention. The yeast culture is performed in the fermentation vessel 1, e.g., of the type comprising an internal partition 2. The air is fed through duct 3, the hydrocarbon through conduit 4 and the aqueous phase and the inorganic compounds through line 5. The culture product is withdrawn from line 6 and introduced into a tank for the lysis operation. Through conduit 8, additional elements can be introduced, particularly acid or basic agents for adjusting the pH value, e.g., potassium hydroxide, hydrochloric acid or sulfuric acid. The pH value is advantageously maintained within the range of from 7 to 9. There can also be added proteolytic enzymes as above mentioned. The effluent from the tank is conveyed, through conduit 9, to the fermentation vessel 10. Through conduit 11, bacteria and, optionally, glycidic acid, may be introduced. Air is fed through line 12. The fermentation vessel 10 may be of the same type as the fermentation vessel 1, or of a different type. The effluent from said fermentation vessel is conveyed through line 13 to the sporulation vessel 14 which can be provided, as the fermentation vessel 1, with an internal partition 15. Air is introduced through line 16. Through line 17 there can be added, if necessary, oligoelements favoring the sporulation. The effluent is conveyed, through line 18, to the centrifuge 19 where there are separated spores and yeast residues, then discharged through line 20, and a liquid phase, conveyed through line 21 to evaporator 22. The evaporated water is discharged through line 23 and the concentrated liquid phase is conveyed, through line 24, to the tank 25 which also receives acetone through line 26. The precipitate, separated from the liquid phase, is conveyed through conduit 27 to the drying apparatus 28, fed with hot air through line 29. The enzymes are finally recovered from line 30.

EXAMPLE 1

This example relates to a batchwise culture. A culture medium of the following composition is prepared :

ammonium acid phosophate — 2.90 g
magnesium sulphate — 0.90 g
potassium chloride — 1.32 g
yeast extract — 0.03 g
spring water (containing oligoelements) — 300.00 g
distilled water — 700.00 g The pH value is adjusted to 4 by adding ammonia and the temperature is brought to 30°C.

This medium is completed by adding 10 g per liter of $C_{12} - C_{18}$ paraffinic hydrocarbons having a 94 percent n-paraffin content and is seeded with 400 ccm of a suspension of 1 g per liter of yeasts of the *Candida lipolytica* genus.

The temperature is maintained at 30° C and the pH to a value of 4 by adding ammonia during the course of the culture which extends over 16 hours. The stirring is obtained by air bubbling.

It is then observed that the straight-chain hydrocarbon content is lower than 0.2 g per liter. The temperature is then increased to 37° C, temperature at which *Candida lipolytica* no longer grows. The pH is adjusted to a value of 7.2 by addition of potassium hydroxide and this value is subsequently maintained by addition of potassium hydroxide or hydrochloric and sulfuric acids. Small amounts of oligoelements : Ca(OH$_2$). Mn Cl$_2$, Fe Cl$_2$, Cu SO$_4$, Zn SO$_4$ are added, together with 1 g of glucose per liter of medium culture.

The seeding is performed with a culture of *Bacillus subtilis*, cultivated on a yeast extract, having a density of 10$^5$ bacteria per ml. This culture is used in a proportion of 25 ccm per liter of fermentation medium.

After 37 hours, the cell concentration is about 10$^9$ bacteria per ml and the sporulation begins in a irreversible manner in relation to the exhausting of the yeast protein content.

The sporulation and the protease excretion, which are concomitant, are continued over a time of 47 hours, at the end of which about 90 percent of the bacteria have actually sporulated.

The culture is withdrawn and then centrifugated or filtrated. The filtrate is recovered, treated with 25 mg/l of chloramphenicol and evaporated under reduced pressure at 35°–40° C until it is reduced to 10 percent of its initial volume.

The concentrate is then subjected to a precipitation with acetone which precipitates the proteins. There are thus recovered 80 percent of the enzymatic activity present in the culture medium.

The precipitate is dried by lyophilization or by use of a spray dryer. In this test, from 10 g of hydrocarbons, there were recovered 3 g of unpurified enzyme having a proteolytic activity of 14,000 proteolytic units per gram.

EXAMPLE 2

This is an example of continuous operation performed in accordance with the diagram of the accompanying drawing and making use of the same inorganic medium and the same hydrocarbons as in example 1.

In a first stage there is performed a continuous culture of yeast on hydrocarbon, i.e., hydrocarbon and inorganic medium are fed so that, in equilibrium conditions, there is obtained a cell concentration of 7 g/liter with a dilution rate $D = 0.15$ v/V, i.e., a production of 1.05 liter × hour. Hereabove $v$ is the hourly feed rate by volume of culture medium and $V$ the volume of the liquid phase in the fermentation vessel.

The effluent from the fermentation vessel is brought to 45° C and enzymes obtained by the process are added thereto. The pH value is maintained within the range of from 6.5 to 8 by addition of KOH. The residence time is about 5 hours. The effluent from this lysis tank is conveyed to the fermentation vessel 10 containing a continuous culture of *Bacillus subtilis*. The conditions in this fermentation vessel are favorable to the growth of *Bacillus subtilis* but unfavorable to its sporulation : temperature : 37° C, pH = 7.2, dilution rate = 0.45. Glucose is injected into the culture medium in a proportion of 1 g per liter. The cell concentration remains at 10$^7$ bacteria per ml.

The effluent from this fermentation vessel is taken again in a last fermentation vessel where the conditions are favorable to the sporulation of *Bacillus subtilis* : the dilution rate is low (< 0.20) and preferably about 0.05. The low growing rate and the exhausting of the medium which both prevail in this fermentation vessel result in optimum conditions for the sporulation and concomitant enzyme excretion.

At this stage, there are added into the fermentation vessel, the oligoelements required for the sporulation, in particular CaCl$_2$, MnCl$_2$, FeSO$_4$, CuCl$_2$ and ZnCl$_2$.

The addition of these elements is not obligatory when their residual concentration in the culture medium is sufficient.

At the outlet from said fermentation vessel, the effluent is filtered or centrifugated for separating the bacterial spore and the yeast residues. This separation is made easier as a result of the fact that the spores are in most cases fixed on the yeast residues and, accordingly are easily separated from the liquid.

The liquid is then evaporated under reduced pressure at 40° C until reduced to 10 percent of its initial volume, in the presence of penicilline. The concentrate is subjected to a precipitation with acetone. The precipitate, recovered by centrifugation, contains 80 percent of the enzymatic activity of the fermentation vessel 14. The precipitate is dried by liophilization.

EXAMPLES 3 to 5

Example 1 is repeated, but with the following microorganisms:

| Example | Microorganisms | Recovery rate of the enzymatic activity |
|---|---|---|
| 3 | Aspergillus glaucus | 75 % |
| 4 | Aspergillus oryzae | 78 % |
| 5 | Bacillus megaterium | 80 % |

EXAMPLE 6

Example 1 is repeated with *Bacillus thuriengiensis*. 70 percent of the enzymatic activity are recovered and the obtained spores exhibit high insecticidal properties.

What I claim as this invention is :

1. In a process for manufacturing enzymes, which comprises the steps of (a) cultivating a hydrolase-excreting bacterium in an aqueous aerated nutrient culture medium containing assimilable nitrogen and carbon at 30°–40° C, (b) subsequently subjecting the resulting culture medium to a spore-forming stage, and (c) separating the aqueous enzyme-containing culture medium from the formed spores, the improvement wherein said assimilable nitrogen and carbon is supplied by feeding the nutrient culture medium with a liquid phase containing yeast cells obtained by growing yeast at 20°–40° C in an aqueous culture phase in contact with hydrocarbons, as the essential carbon substrate, at least 10 percent of which are straight-chain paraffinic hydrocarbons, whereby said formed spores are fixed onto the yeast cells and are easily separated from said aqueous enzyme-containing culture medium.

2. A process according to claim 1, wherein the carbon substrate of the yeast growing step consists essentially of hydrocarbons at least 85 percent of which are straight-chain paraffinic hydrocarbons.

3. A process according to claim 1, wherein the aqueous culture phase in which the yeast is grown has a pH of from 2.5 to 6.5 and the aqueous culture medium in which the bacterium is cultivated has a pH of 6–9.

4. A process according to claim 3, wherein the aqueous culture phase in which the yeast is grown has a pH of 3–6 and a temperature of 27°–33° C and the aqueous culture medium in which the bacterium is cultivated has a pH of 6.5–8.5 and a temperature of 34°–39° C.

5. A process according to claim 1, wherein the aqueous culture medium also contains 0.1–2 g of n-paraffinic hydrocarbons per liter.

6. A process according to claim 1, wherein the yeast containing liquid phase is maintained at 40°–65° C before being fed to the aqueous culture medium.

7. A process according to claim 6, wherein the liquid phase is maintained at 40°–65° C for ½–24 hours.

8. A process according to claim 6, wherein the pH of the yeast containing liquid phase is 7–9.

9. A process according to claim 6, wherein the liquid phase contains proteolytic enzymes.

10. A process according to claim 6, wherein the liquid phase contains mercaptoethanol.

11. A process according to claim 1, wherein step (a) is carried out from 5–30 hours.

12. A process according to claim 1, wherein at least one oligoelement selected from the group consisting of $Ca^{++}$, $Mn^{++}$, $Fe^{++}$, $Cu^{++}$, and $Zn^{++}$ is supplied to the aqueous culture medium during step (b).

13. A process according to claim 1, wherein the bacterium is *Bacillus subtilis*.

14. A process according to claim 1, wherein the yeast is *Candida Lipolytica*.

15. In a process for manufacturing enzymes, which comprises the steps of (a) cultivating a hydrolase-excreting bacterium in an aqueous aerated nutrient culture medium containing assimilable nitrogen and carbon at 30°–40° C, (b) subsequently subjecting the resulting culture medium to a spore-forming stage, and (c) separating the aqueous enzyme-containing culture medium from the formed spores, the improvement wherein said assimilable nitrogen and carbon is supplied by feeding the nutrient culture medium with a liquid phase containing yeast cells, whereby said formed spores are fixed onto the yeast cells and are easily separated from said aqueous enzyme-containing culture medium.

16. A process according to claim 15, wherein the bacterium is *Bacillus subtilis*.

* * * * *